(12) United States Patent
Yamaguchi

(10) Patent No.: US 7,602,541 B2
(45) Date of Patent: Oct. 13, 2009

(54) OPTICAL BEAM SCANNING APPARATUS AND IMAGE FORMING APPARATUS

(75) Inventor: Masao Yamaguchi, Katsushika-ku (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 368 days.

(21) Appl. No.: 11/694,537

(22) Filed: Mar. 30, 2007

(65) Prior Publication Data

US 2008/0239438 A1  Oct. 2, 2008

(51) Int. Cl.
G02B 26/08 (2006.01)

(52) U.S. Cl. .............. 359/205.1; 359/207.7; 359/208.1

(58) Field of Classification Search ........................ None
See application file for complete search history.

(56) References Cited

U.S. PATENT DOCUMENTS 6,847,389 B2 * 1/2005 Shiraishi ..................... 347/134
6,888,655 B2   5/2005 Yamaguchi

FOREIGN PATENT DOCUMENTS

| JP | 2002-328323 | 11/2002 |
|---|---|---|
| JP | 2005-024958 | 1/2005 |
| JP | 2005-049506 | 2/2005 |
| JP | 2005-049509 | 2/2005 |
| JP | 2005-062399 | 3/2005 |

OTHER PUBLICATIONS

Beiser, Laser Scanning Notebook, LSN-8-11/91, The Polygon Scanner, 1992.

* cited by examiner

*Primary Examiner*—James Phan
(74) *Attorney, Agent, or Firm*—Turocy & Watson, LLP

(57) ABSTRACT

In an image forming apparatus provided with an optical beam scanning apparatus according to the invention, an optical beam scanning apparatus of an overillumination scanning optical system includes a semiconductor laser device as a light source, a pre-deflection optical system, a polygon mirror, and a post-deflection optical system, with a width of the luminous flux made incident on the polygon mirror being wider than a width of one reflecting surface forming the polygon mirror, wherein at least two sheets of flat plate for transmitting the luminous flux scanned by the polygon mirror are provided in the post-deflection optical system. In accordance with an image forming apparatus provided with an optical beam scanning apparatus according to the invention, not only a wave front aberration on a photoconductive drum can be suitably corrected, but suitable beam diameter and beam profile can be obtained on the photoconductive drum.

20 Claims, 13 Drawing Sheets

INCIDENT SURFACE

| CUY | CYZ | AY | AZ |
|---|---|---|---|
| -6.19E-03 | -7.12E-03 | 1 | 1 |

| | | m | | | | | | | | | |
|---|---|---|---|---|---|---|---|---|---|---|---|
| | | 0 | 1 | 2 | 3 | 4 | 5 | 6 | 7 | 8 | 9 | 10 |
| n | 0 | 0.00E+00 | -1.54E-03 | 1.84E-03 | -2.07E-07 | 1.18E-07 | 5.92E-12 | -5.89E-12 | -2.33E-15 | 3.31E-16 | -1.28E-19 | -1.93E-20 |
| | 1 | 1.34E-02 | -1.25E-06 | -2.09E-07 | -1.37E-10 | 1.11E-10 | -5.79E-14 | -8.30E-15 | -1.04E-17 | 4.72E-19 | 1.31E-21 | 2.24E-23 |
| | 2 | 2.26E-05 | -1.73E-09 | 4.67E-11 | 3.62E-12 | -1.18E-13 | -1.23E-15 | 2.14E-17 | -3.94E-21 | 8.65E-21 | 1.92E-23 | -1.93E-25 |

EMITTING SURFACE

| CUY | CYZ | AY | AZ |
|---|---|---|---|
| 3.26E-03 | 2.76E-02 | 1 | 1 |

| | | m | | | | | | | | | |
|---|---|---|---|---|---|---|---|---|---|---|---|
| | | 0 | 1 | 2 | 3 | 4 | 5 | 6 | 7 | 8 | 9 | 10 |
| n | 0 | 0.00E+00 | -1.69E-03 | -9.88E-04 | -1.85E-07 | 6.45E-08 | -6.44E-12 | -3.12E-12 | 3.44E-16 | 1.40E-16 | -3.37E-19 | -1.74E-20 |
| | 1 | 3.37E-02 | -7.72E-07 | -4.14E-07 | -2.46E-10 | 6.75E-11 | 2.42E-14 | -1.50E-15 | -1.30E-17 | -1.04E-19 | 3.36E-22 | 4.27E-23 |
| | 2 | 5.30E-06 | 7.69E-10 | 4.85E-10 | 2.42E-13 | 1.44E-13 | 1.32E-16 | -2.28E-17 | -1.32E-19 | 3.18E-21 | 1.54E-23 | 3.40E-25 |

FIG. 4

OPTICAL BEAM SCANNING APPARATUS AND IMAGE FORMING APPARATUS

BACKGROUND OF THE INVENTION

1. Technical Field of the Invention

The present invention relates to an optical beam scanning apparatus and an image forming apparatus provided with this optical scanning apparatus. In particular, the invention relates to an optical beam scanning apparatus which in an overillumination scanning optical system in which a width of an luminous flux made incident on a polygon mirror is wider than a width of one reflecting surface forming the polygon mirror, is able to scan the luminous flux on a photoconductive drum and an image forming apparatus provided with this optical beam scanning apparatus.

2. Related Art

In recent years, in image forming apparatus of an electrophotographic mode, for example, laser printers, digital copiers and laser facsimiles, an optical beam scanning apparatus for irradiating laser light (optical beam) on a surface of a photoconductive drum and scanning the laser light to form an electrostatic latent image on the photoconductive drum is provided.

Recently, in order to devise to realize high-speed scanning on a surface of a photoconductive drum, for example, a method in which plural light sources (laser diodes) are provided in one laser unit, thereby increasing the number of laser light (multibeam mode) is proposed. In this multibeam method, plural beams for every color component emitted from each of light sources (for example, yellow, magenta, cyan, and black) are processed in a pre-deflection optical system and converted into one beam, which is then made incident on a polygon mirror. The beam deflected by the polygon mirror is mediated through an fθ lens configuring a post-deflection optical system and subsequently separated into a beam for every color component and irradiated on a photoconductive drum of every color component.

Here, the rotation axis direction of the polygon mirror as a deflector is defined as "sub-scanning direction", and a direction vertical to each of the optical axis direction of the optical system and the rotation axis direction of the deflector (polygonal mirror) is defined as "main scanning direction". Incidentally, the sub-scanning direction in the optical system is corresponding to a conveyance direction of a transfer material in an image forming apparatus, and the main scanning direction in the optical system is corresponding to a direction vertical to the conveyance direction within a surface of the transfer material in the image forming apparatus. Also, an image surface shows the surface of the photoconductive drum, and an imaging surface shows a surface on which a luminous flux (laser light) actually forms an image.

In general, a relation expressed by [Expression 1] is present among an image processing rate (paper conveyance rate), an image resolution, a motor rotation rate and a number of polygon mirror surfaces.

$$P * R = \frac{25.4 * Vr * N}{60} \quad \text{[Expression 1]}$$

In the foregoing expression, P (mm/s) represents a processing rate (paper conveyance rate); and R (dpi) represents an image resolution (number of dots per inch) Also, Vr (rpm) represents a number of revolutions of polygon motor; and N represents a number of polygon mirror surfaces.

As expressed by the foregoing [Expression 1], the printing speed and resolution in the image forming apparatus are proportional to the number of revolutions of polygon motor (Vr) and the number of polygon mirror surfaces (N). Accordingly, in order to realize high resolution as well as high speed in the image forming apparatus, it is necessary to increase the number of polygon mirror surfaces (N) or to raise the number of revolutions of polygon motor (Vr).

However, in a conventional general underillumination scanning optical system, a width of a luminous flux (laser light) made incident on a polygon mirror in a main scanning direction is made smaller than a width of one reflecting surface forming the polygon mirror in the main scanning direction (reflection width), thereby reflecting the whole of the luminous flux (laser light) made incident on the polygon mirror.

However, since not only a beam diameter on the image surface is proportional to an F number, but also the F number is expressed by Fn=f/D wherein f represents a focal distance of the imaging optical system, and D represents a beam diameter of the main scanning direction on the polygon mirror surface, when it is intended to make the beam diameter on the image surface small for the purpose of devising to realize high image quality, the beam diameter of the main scanning direction on the polygon mirror surface must be made large.

In other words, in order to obtain high image quality at a certain fixed level or more, there is present a restriction that the beam diameter of the main scanning direction on the polygon mirror surface must be regulated to a fixed size or more.

Nevertheless, in order to realize high resolution as well as high speed, when it is intended to increase the number of polygon mirror surfaces (N), the polygon mirror itself must be increased in size. As a result, when it is intended to rotate a large-sized polygon mirror at a high speed, a load to a motor for driving the polygon mirror becomes large, and the motor cost increases. In addition, at the same time, the noise or vibration of the motor or the generation of a heat becomes large, and a countermeasure thereto becomes necessary separately.

Then, an image forming apparatus using an over-illumination scanning optical system is proposed in place of the underillumination scanning optical system. In the overillumination scanning optical system, a width of a luminous flux made incident on a polygon mirror is made wider than a width of one reflecting surface forming the polygon mirror.

According to this, it is possible to reflect the luminous flux by using the entire surface of the reflecting surface forming the polygon mirror (or plural reflecting surfaces); and even in the case where it is intended to ensure the beam diameter on the polygon mirror surface while increasing the number of reflecting surfaces of polygon mirror (N) for the purpose of devising to realize high resolution as well as high speed, it is possible to make the diameter of the polygon mirror itself small. Accordingly, a load to a motor for driving the polygon mirror can be reduced, and the motor cost can be reduced. Also, since not only the diameter of the polygon mirror itself can be made small, but also the number of reflecting surfaces can be increased, it is possible to make the shape of the polygon mirror close to a circle, and it is possible to make the air resistance at the time of driving the polygon mirror low. As a result, even when the polygon mirror is rotated in a high speed, it is possible to reduce the noise or vibration and the generation of a heat.

Furthermore, following the reduction in the noise or vibration and the generation of heat, the whole or a part of countermeasures parts for reducing the noise or vibration, such as glasses, become unnecessary, and the costs in manufacturing an image forming apparatus can be lowered. Also, a high duty cycle becomes possible.

The foregoing overillumination scanning optical system is described in, for example, Leo Beiser, *Laser Scanning Notebook*, SPIE OPTICAL ENGINEERING PRESS.

In general, in scanning a luminous flux made incident from a semiconductor laser device on a photoconductive drum, in the underillumination scanning optical system, an edge part of a polygon mirror is not used, whereas in the overillumination scanning optical system, an edge part of a polygon mirror is used.

For that reason, since an error in the shape in the edge part of the main scanning direction of the polygon mirror is large, when a luminous flux is deflected (scanned) by using the edge part, the luminous flux to be deflected (scanned) becomes dull, whereby a wave front aberration is deteriorated in the entire scanning region on the photoconductive drum. As a result, the beam diameter on the photoconductive drum as an image surface increases, whereby a beam profile is deteriorated.

SUMMARY OF THE INVENTION

In view of such circumstances, the invention has been made and is aimed to provide an optical beam scanning apparatus in which not only a wave front aberration on a photoconductive drum can be suitably corrected, but suitable beam diameter and suitable beam profile can be obtained on the photoconductive drum and an image forming apparatus provided with this optical beam scanning apparatus.

In order to solve the foregoing problems, an optical beam scanning apparatus according to an aspect of the invention is an optical beam scanning apparatus including a light source configured to emit a luminous flux, a pre-deflection optical system configured to form a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system configured to image the luminous flux scanned by the scanning unit on the scanning subject, in which a width of the luminous flux made incident on the scanning unit from the pre-deflection optical system is wider than a width of one reflecting surface forming the scanning unit, wherein at least two sheets of flat plate configured to transmit the luminous flux scanned by the scanning unit are provided in the post-deflection optical system.

In order to solve the foregoing problems, an image forming apparatus according to an aspect of the invention is an image forming apparatus provided with an optical beam scanning apparatus including a light source configured to emit a luminous flux, a pre-deflection optical system configured to form a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system configured to form the luminous flux scanned by the scanning unit on the scanning subject, in which a width of the luminous flux made incident on the scanning unit from the pre-deflection optical system is wider than a width of one reflecting surface forming the scanning unit, wherein at least two sheets of flat plate configured to transmit the luminous flux scanned by the scanning unit are provided in the post-deflection optical system.

In the optical beam scanning apparatus according to an aspect of the invention, in the optical beam scanning apparatus including a light source configured to emit a luminous flux, a pre-deflection optical system configured to form a luminous flux emitted from the light source to image the luminous flux as a line image in a prescribed direction corresponding to a main scanning direction, a scanning unit configured to scan the imaged luminous flux by the pre-deflection optical system against a scanning subject, and a post-deflection optical system configured to image the luminous flux scanned by the scanning unit on the scanning subject, in which a width of the luminous flux made incident on the scanning unit from the pre-deflection optical system is wider than a width of one reflecting surface forming the scanning unit, at least two sheets of flat plate configured to transmit the luminous flux scanned by the scanning unit are provided in the post-deflection optical system.

In the image forming apparatus according to an aspect of the invention, in image forming apparatus provided with an optical beam scanning apparatus including a light source configured to emit a luminous flux, a pre-deflection optical system configured to form a luminous flux emitted from the light source to image the luminous flux as a line image in a prescribed direction corresponding to a main scanning direction, a scanning configured to scan the imaged luminous flux by the pre-deflection optical system against a scanning subject, and a post-deflection optical system configured to image the luminous flux scanned by the scanning unit on the scanning subject, in which a width of the luminous flux made incident on the scanning unit from the pre-deflection optical system is wider than a width of one reflecting surface forming the scanning unit, at least two sheets of flat plate configured to transmit the luminous flux scanned by the scanning unit are provided in the post-deflection optical system.

BRIEF DESCRIPTION OF THE DRAWINGS

In the accompanying drawings,

FIG. 4 is a diagram to show respective factors of a surface shape of an imaging lens;

DETAILED DESCRIPTION OF THE PREFERRED EMBODIMENTS

Embodiments of the invention are hereunder described with reference to the drawings.

Figure 1:
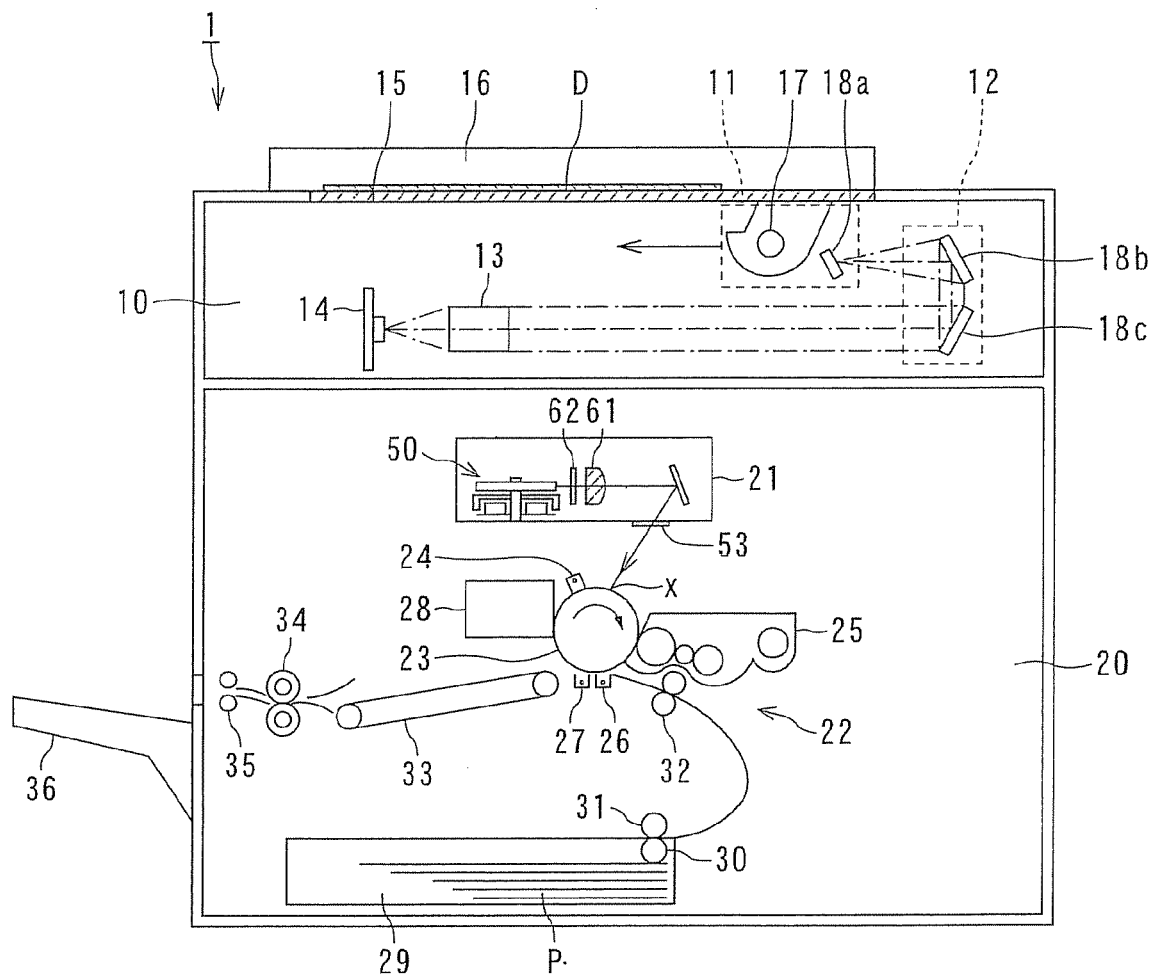
FIG. 1 is a view to show a configuration of an image forming apparatus provided with an optical beam scanning apparatus according to the invention.

FIG. 1 shows a configuration of an image forming apparatus 1 provided with an optical beam scanning apparatus 21 according to the invention.

As illustrated in FIG. 1, the image forming apparatus 1 includes, for example, a scanner section 10 as an image reading unit and a printer section 20 as an image forming unit.

The scanner section 10 has a first carriage 11 formed movably into an arrow direction; a second carriage 12 to be moved following the first carriage 11; an optical lens 13 for imparting a prescribed imaging characteristic to light from the second carriage 12; a photoelectric conversion device 14 for not only photoelectrically converting the light to which a prescribed imaging characteristic has been imparted by the optical lens 13 but outputting an electric signal after the photoelectric conversion; an original table 15 for holding an original D; an original fixing cover 16 for fixing the original D by pressing it onto the original table 15, and the like.

The first carriage 11 is provided with a light source 17 for illuminating the original D and a mirror 18a for reflecting catoptric light reflected from the original D upon illumination with light emitted from the light source 17 towards the second carriage 12.

The second carriage 12 has a mirror 18b for bending light guided from the mirror 18a of the first carriage 11 by 90° and a, mirror 18c for further bending the light which has been bent by the mirror 18b by 90°.

The original D placed on the original table 15 is illuminated by the light source 17, thereby reflecting catoptric light where light and shade of light corresponding to the presence or absence of an image is distributed. This catoptric light due to the original D is made incident and guided as image information of the original D into the optical lens 13 via the mirrors 18a, 18b and 18c.

The catoptric light guided into the optical lens 13 from the original D is collected on a light-receiving surface of the photoelectric conversion device (for example, a CCD sensor) 14 by the optical lens 13.

Then, when an indication to start the image formation is inputted from a non-illustrated operation panel or external apparatus, the first carriage 11 and the second carriage 12 are once moved to a home position which is determined in advance so as to have a prescribed positional relation to the original table 15 by drive of a non-illustrated carriage driving motor.

Thereafter, when the first carriage 11 and the second carriage 12 are moved along the original table 15 at a prescribed rate, not only the image information of the original D, namely the catoptric light (image light) reflected from the original D is cut out in a prescribed width along a direction where the mirror 18a is extended, namely a main scanning direction and reflected towards the mirror 18b, but the catoptric light reflected from the original D is successively taken out in units of a width cut out from the mirror 18a with respect to a direction orthogonal to the direction where the mirror 18a is extended, namely a sub-scanning direction. According to this, all the image information of the original D is guided into the photoelectric conversion device 14. Incidentally, an electric signal outputted from the photoelectric conversion device 14 is an analogue signal and is converted into a digital signal by a non-illustrated A/D converter and temporarily stored as an image signal in a non-illustrated image memory.

Thus, the image of the original D placed on the original table 15 is converted into a digital image signal of, for example, 8 bits exhibiting light and shape of an image in a non-illustrated image processing section for every one line along the first direction where the mirror 18a is extended by the photoelectric conversion device 14.

The printer section 20 has the optical beam apparatus 21 as an exposure apparatus as explained later by referring to FIG. 2 and FIG. 3 and an image forming section 22 of an electrophotographic mode capable of forming an image on recording paper P as a medium on which an image is formed.

Figure 3:
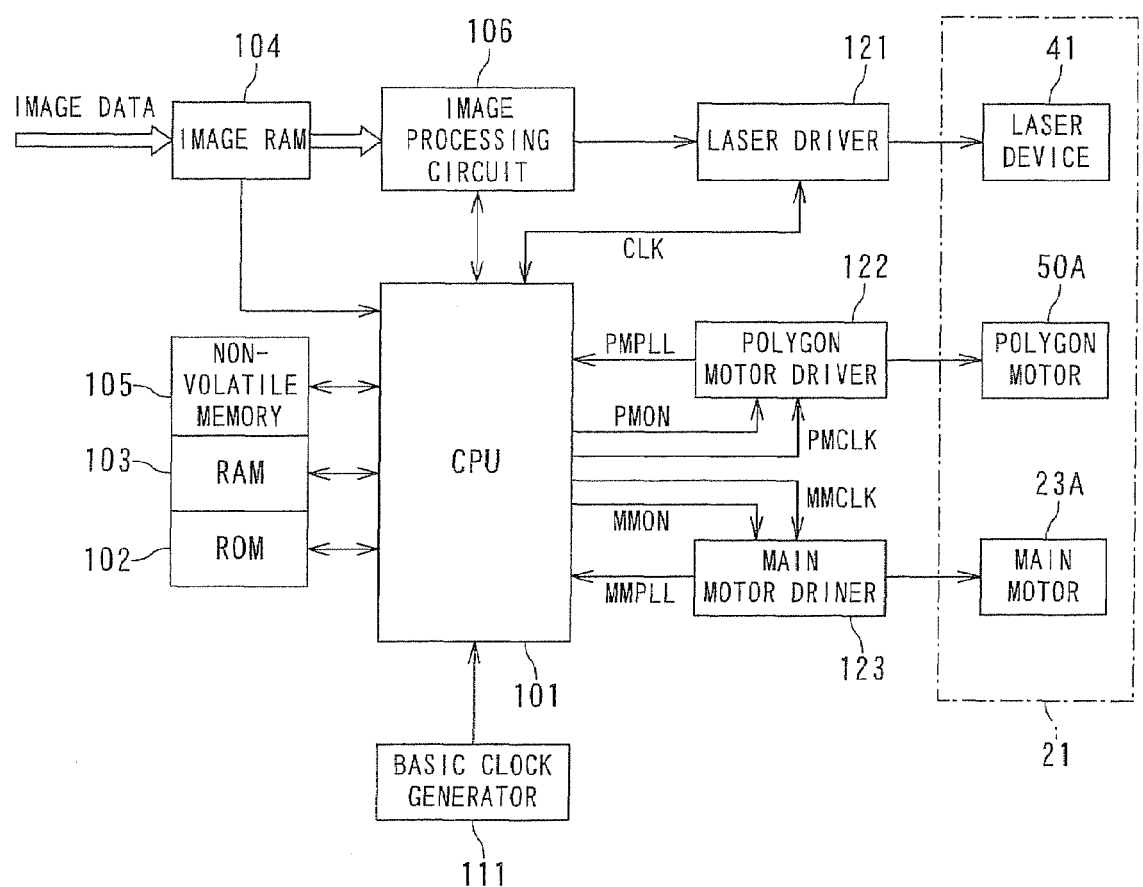
FIG. 3 is a view to show an outline configuration of the inside of a control system of an image forming apparatus provided with the optical beam scanning apparatus of FIG. 2.

The image forming section 22 is rotated by a main motor 23A such that an outer peripheral surface is moved at a prescribed rate as explained by referring to FIG. 3. The image forming section 22 has a drum-like photoconductor (hereinafter referred to as "photoconductive drum") 23 on which an electrostatic latent image is formed corresponding to an image data, namely the image of the original D upon irradiation with a laser beam (laser light) L from the optical beam scanning apparatus 21; a charging apparatus 24 for giving a surface potential of a prescribed polarity to a surface of the photoconductive drum 23; a development apparatus 25 for selectively feeding a toner as a visualizing material to the electrostatic latent image on the photoconductive drum 23 formed by the optical beam scanning apparatus and developing it; a transfer apparatus 26 for giving a prescribed electric field to a toner image formed on the outer periphery of the photoconductive drum 23 by the development apparatus 25 and transferring it onto the recording paper P; a separation apparatus 27 for releasing the recording paper P onto which the toner image has been transferred by the transfer apparatus 26 and the toner between the recording paper P and the photoconductive drum 23 from electrostatic adsorption with the photoconductive drum 23 and separating them from the photoconductive drum 23; and a cleaning apparatus 28 for removing the transfer residual toner remaining on the outer peripheral surface of the photoconductive drum 23 and returning the potential distribution of the photoconductive drum 23 to a state before the surface potential is fed by the charging apparatus 24; and the like.

Incidentally, the charging apparatus 24, the development apparatus 25, the transfer apparatus 26, the separation apparatus 27 and the cleaning apparatus 28 are disposed in this order along an arrow direction in which the photoconductor drum 23 is rotated. Also, the laser beam L from the optical beam scanning apparatus 21 is irradiated in a prescribed position X on the photoconductive drum 23 between the charging apparatus 24 and the development apparatus 25.

In a non-illustrated image processing section, an image signal read from the original D in the scanner section 10 is not only converted into a printing signal by processing, for example, contour correction or gradation processing for half tone display but converted into a laser modulation signal for changing a light intensity of the laser beam L emitted from a semiconductor laser device (semiconductor laser device 41 of FIG. 2) of the optical beam scanning apparatus 21 as described later to any one of an intensity at which an electrostatic latent image can be recorded on the outer periphery of the photoconductive drum 23 to which a prescribed surface potential is given by the charging apparatus 24 or an intensity at which the latent image is not recorded.

Each semiconductor laser device (semiconductor laser device 41 of FIG. 2) provided in the optical beam scanning apparatus 21 is subjected to intensity modulation based on the foregoing laser modulation signal and emits light so as to record an electrostatic latent image in a prescribed position of the photoconductive drum 23 corresponding to a prescribed image data. This laser light from the semiconductor laser device is deflected in a first direction which is the same direction as a reading line of the scanner section 10 by a deflector (polygon mirror 50 as a deflector of FIG. 2) within the optical beam scanning apparatus 21 and irradiated in the prescribed position X on the outer periphery of the photoconductive drum 23.

Then, when the photoconductive drum 23 is rotated in the arrow direction at a prescribed rate, similar to the movement of the first carriage 11 and the second carriage 12 of the scanner section 10 along the original table 7, a laser beam from the semiconductor laser device which is successively deflected by the deflector (polygon mirror 50 as a deflector of FIG. 2) within the optical beam scanning apparatus 21 is exposed at prescribed intervals on the outer periphery of the photoconductive drum 23 for every one line.

An electrostatic latent image corresponding to the image signal is thus formed on the outer periphery of the photoconductive drum 23.

The electrostatic latent image formed on the outer periphery of the photoconductive drum 23 is developed with a toner from the development apparatus 25. A toner image developed with the toner is not only conveyed to a position opposing to the transfer apparatus 26 due to the rotation of the photoconductive drum 23 but transferred onto the recording paper P which is fed by taking out a single sheet thereof from a paper cassette 29 by a paper feed roller 30 and a separation roller 31 and then adjusting the timing by aligning rollers 32, due to an electric field from the transfer apparatus 26.

The recording paper P onto which the toner image has been transferred is separated together with the toner by the separation apparatus 27 and guided into a fixation apparatus 34 by a conveyance apparatus 33.

The recording paper P guided into the fixation apparatus 34 is subjected to fixation of the toner (toner image) due to a heat and a pressure from the fixation apparatus 34 and then discharged into a tray 36 by paper discharge rollers 35.

On the other hand, the photoconductive drum 23 in which the toner image (toner) has been transferred onto the recording paper P by the transfer apparatus 26 is made opposed to the cleaning apparatus 28 due to the subsequent continuous rotation. Then, the transfer residual toner (residual toner) remaining on the outer peripheral surface of the photoconductive drum 23 is removed by the cleaning apparatus 28. Furthermore, the photoconductive drum 23 is returned to an initial state which is a state before feeding a surface potential by the charging apparatus 24. According to this, next image formation becomes possible.

By repeating the foregoing process, a continuous image forming action becomes possible.

Thus, when the image information is read in the scanner section 10 and the read image information is converted into a toner image in the printer section 20 and outputted onto the recording paper P, the original D set on the original table 15 is copied.

Incidentally, while the foregoing image forming apparatus 1 has been applied to a digital copier or the like, it is not limited to such case. For example, it may be applied to a printer apparatus in which an image reading section is not present or the like.

Figure 2A:
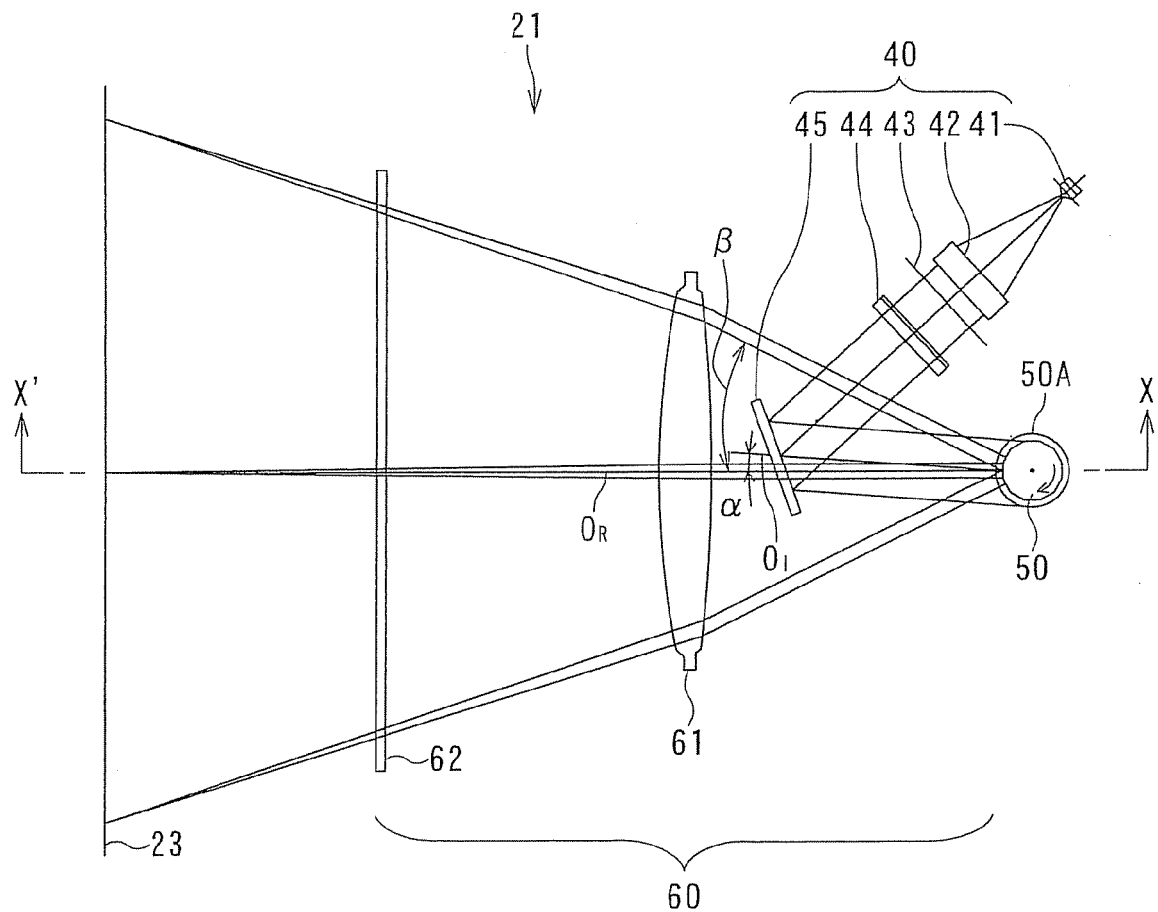
FIG. 2 is a view to show a detailed configuration of the optical beam scanning apparatus of FIG. 1.
Figure 2B:
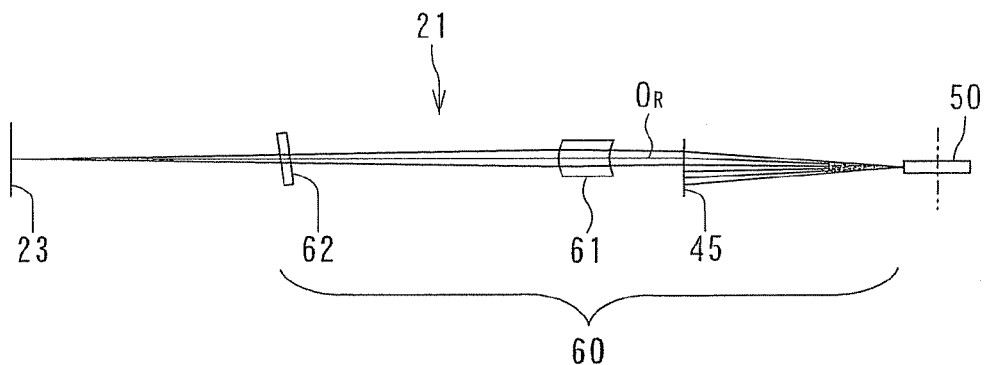

FIG. 2(a) and FIG. 2(b) each shows a detailed configuration of the optical beam scanning apparatus 21 of FIG. 1. Incidentally, FIG. 2(a) is an outline plan view in the case where plural optical elements disposed between a light source (semiconductor laser device 41) included in the optical beam scanning apparatus 21 and the photoconductive drum 23 (defined as "scanning subject") are viewed from an orthogonal direction (sub-scanning direction) to a main scanning direction which is a parallel direction to a direction in which laser light going from the polygon mirror 50 as a deflector towards the photoconductive drum 23 is scanned by the polygon mirror 50. FIG. 2(b) is an outline cross-sectional view of the optical beam scanning apparatus 21 on an X-X' line of FIG. 2(a).

As illustrated in FIG. 2(a) and FIG. 2(b), the optical beam scanning apparatus 21 has a pre-deflection optical system 40 having the semiconductor laser device 41 for emitting the laser beam (laser light) L of, for example, 658 nm; a collimation lens 42 for converting a cross-sectional beam shape of the laser beam L emitted from the semiconductor laser device 41 into convergent light or parallel light or divergent light; an aperture 43 for controlling the quantity of light (luminous flux width) of the laser beam L which has passed through the collimation lens 42 to a prescribed size; a cylindrical lens 44 which is given a positive power only in the sub-scanning direction for the purpose of arranging the cross-sectional shape of the laser beam L, the quantity of light of which has been controlled by the aperture 43, into a prescribed cross-sectional beam shape; a mirror 45 for bending the laser beam L from the semiconductor laser device 41, which has been arranged into a prescribed cross-sectional beam shape by a finite focal lens or the collimation lens 42, the aperture 43 and the cylindrical lens 44, in a prescribed direction; and the like.

The polygon mirror 50 integrally formed with a polygon mirror motor 50A rotating at a prescribed rate is provided In a direction where the laser beam L to which a prescribed cross-sectional beam shape has been given by the pre-deflection optical system 40 advances. The polygon mirror 50 scans the laser beam L, the cross-sectional beam shape of which has been arranged into the prescribed shape by the cylindrical lens 44, towards the photoconductive drum 23 positioned at a later stage.

A post-deflection optical system 60 for imaging the laser beam L which is continuously reflected on each of reflecting surfaces of the polygon mirror 50 in a generally straight line along an axis direction of the photoconductive drum 23 is provided between the polygon mirror 50 and the photoconductive drum 23. Incidentally, the "post-deflection optical system" in the embodiment of the invention means all of optical systems between the polygon mirror 50 and the photoconductive drum 23 and includes an optical system between the polygon mirror 50 and an imaging lens 61 and an optical system between the imaging lens 61 and the photoconductive drum 23.

The post-deflection optical system 60 is composed of the imaging lens (generally called as "fθ lens") 61; a dustproof glass 62 for preventing turnaround of the toner, dusts or paper powder or the like floating within the image forming section 22 into a non-illustrated housing of the optical beam scanning apparatus 21; and the like. The imaging lens 61 is able to irradiate the laser beam L continuously reflected on the individual reflecting surfaces of the polygon mirror 50 from one end to the other end of the longitudinal (axis) direction of the photoconductive drum 23 in the exposing position X as illustrated in FIG. 1 while making the position on the photoconductive drum 23 proportional to a rotation angle of each of the reflecting surface of the polygon mirror 50 upon irradiation on the photoconductive drum 23 and also to provide convergence properties to which a prescribed relation based on an angle at which the polygon mirror 50 is rotated so as to have a prescribed cross-sectional beam diameter in any position of the longitudinal direction on the photoconductive drum 23.

Incidentally, an optical path of the laser beam L from the semiconductor laser device 41 within the optical beam scanning apparatus 21 to the photoconductive drum 23 is bent within a non-illustrated housing of the optical beam scanning apparatus 21 by non-illustrated plural mirrors or the like. Also, the imaging lens 61 and at least one non-illustrated mirror may be integrally formed in advance by optimizing curvatures of the imaging lens 61 in the main scanning direction and the sub-scanning direction and an optical path between the polygon mirror 50 and the photoconductive drum 23.

Also, in the optical beam scanning apparatus 21 as illustrated in FIG. 2(a) and FIG. 2(b), when an axis $O_I$ along a principal ray of the laser beam L made incident on each of the reflecting surfaces of the polygon mirror 50 and an optical axis $O_R$ of the post-deflection optical system 60 are each projected on a main scanning plane on the photoconductive drum 23, an angle α formed by the both is 5°, whereas a scanning angle α of a half-image region is 26°. Also, in the optical beam scanning apparatus 21 as illustrated in FIG. 2(a) and FIG. 2(b), an angle formed by the laser beam L made incident and the optical axis $O_R$ of the post-deflection optical system 60 is 2°.

Next, FIG. 3 shows an outline configuration of the inside of a control system of the image forming apparatus 1 including the optical beam scanning apparatus 21 as illustrated in FIG. 2(a) and FIG. 2(b).

A CPU (central processing unit) 101 as a main control apparatus is connected with a ROM (read only memory) 102 storing a prescribed operation rule or initial data; a RAM (random access memory) 103 for temporarily storing an inputted control data, a result of arithmetic processing by the CPU 101, or the like; an image RAM 104 for not only holding an image data from the photoelectric conversion device 14 or an image data fed from an external apparatus but outputting an image data to an image processing circuit 106; an NVM (non-volatile memory) 105 for holding a data which has been stored so far even in the case where electricity to the image forming apparatus 1 is blocked due to battery backup; the image processing circuit 106 for subjecting the image data stored in the image RAM 104 to prescribed image processing, and then outputting it to a laser driver 121; and the like.

Also, the CPU 101 is connected with the laser driver 121 for making the semiconductor laser device 41 of the optical beam scanning apparatus 21 emit light; a polygon motor driver 122 for driving the polygon motor 50A for rotating the polygon mirror 50; a main motor driver 123 for driving the main motor 23A for driving the photoconductive drum 23, a conveyance mechanism of the recording paper P or the like; and the like.

In the optical beam scanning apparatus 21, the divergent laser beam L emitted from the semiconductor laser device 41 is converted into convergent light, parallel light or divergent light with respect to the cross-sectional beam shape by the lens 42.

The laser beam L, the cross-sectional beam shape of which has been converted into a prescribed shape, passes through the aperture 43, whereby not only the luminous flux width and the quantity of light are optimally set up, but prescribed convergence properties are given only in the sub-scanning direction by the cylindrical lens 44. According to this, the laser beam L becomes linear (line image) extending in the main scanning direction on each of the reflecting surfaces of the polygon mirror 50.

The polygon mirror 50 is, for example, a regular dodecahedron and is formed so as to have an inscribed circle diameter Dp of about 25 mm. When the number of reflecting surfaces of the polygon mirror 50 is defined as N, a width Wp of the main scanning direction of each of the reflecting surfaces (12 surfaces) of the polygon mirror 50 can be determined as expressed by [Expression 2].

$$Wp = \tan(\pi/N) \times Dp \qquad \text{[Expression 2]}$$

In the case of the embodiment of the invention, the width Wp of the main scanning direction of each of the reflecting surfaces (12 surfaces) of the polygon mirror 50 is Wp=tan(π/12)×25=6.70 mm.

On the other hand, a beam width $D_L$ of the main scanning direction of the laser beam L irradiated on each of the reflecting surfaces of the polygon mirror 50 is generally 32 mm and is set up widely as compared with the width Wp=6.70 mm of the main scanning direction of the individual reflecting surfaces of the polygon mirror 50. By setting up the beam width $D_L$ of the main scanning direction of the laser beam L widely in the main scanning direction, it is possible to reduce scattering in the quantity of light between the scanning end and the scanning center on the image surface (photoconductive drum 23).

The laser beam L which has been scanned (deflected) in a straight line upon being guided onto each of the reflecting surfaces of the polygon mirror 50 and then continuously reflected due to the rotation of the polygon mirror 50 is imparted a prescribed imaging characteristic by the imaging lens 61 of the post-deflection optical system 60 such that the cross-sectional beam diameter is generally uniform in at least the main scanning direction on the photoconductive drum 23 (image surface) and imaged in a generally straight line on the surface of the photoconductive drum 23.

Also, the rotation angle of the individual reflecting surfaces of the polygon mirror 50 and the scanning position (imaging position) of the light beam imaged on the photoconductive drum 23 are corrected by the imaging lens 61 so as to have a proportional relation with each other. Accordingly, the speed of the light beam which is scanned in a straight line on the photoconductive drum 23 becomes constant over the entire scanning region by the imaging lens 61. Incidentally, in the imaging lens 61, the respective reflecting surfaces of the polygon mirror 50 are individually non-parallel to the sub-scanning direction, namely a curvature (curvature of the sub-scanning direction) capable of correcting a deviation of the scanning position in the sub-scanning direction due to an influence caused by the generation of inclination on each of the reflecting surfaces is imparted. Furthermore, an image surface curve of the sub-scanning direction is corrected, too. In order to correct these optical characteristics, the curvature of the sub-scanning direction is changed by the scanning position.

The shape of the lens surface of the imaging lens 61 has numerical values as shown in, for example, FIG. 4 and is defined according to [Expression 3].

$$X = \frac{CUY*y^2 + CUZ*z^2}{1+\sqrt{1-AY*\frac{CUY^2*}{y^2-AZ*}CUZ^2*z^2}} + \sum_{n=0}\sum_{m=0}A_{mn}y^m z^{2n}$$ [Expression 3]

By using such imaging lens 61, the rotation angle θ of the individual reflecting surfaces of the polygon mirror 50 and the position of the laser beam L to be imaged on the photoconductive drum 23 are made generally proportional to each other, it is possible to correct the position when the laser beam L is imaged on the photoconductive drum 23.

Also, the imaging lens 61 is able to correct a deviation of the inclination of the sub-scanning direction of the mutual respective reflecting surfaces of the polygon mirror 50, namely a deviation of the position of the sub-scanning direction caused due to scattering in the amount of surface inclination.

Concretely, by making the laser beam incident surface (the side of the polygon mirror 50) and the emitting surface (the side of the photoconductive drum 23) of the imaging lens 61 have a generally optical conjugated relation, even in the case where an inclination defined between an arbitrary reflecting surface of the polygon mirror 50 and the rotation axis of the polygon mirror 50 defers in every reflecting surface, it is possible to correct a deviation of the scanning position of the sub-scanning direction of the laser beam L guided onto the photoconductive drum 23.

Incidentally, since the cross-sectional beam diameter of the laser beam L replies upon a wavelength of the light beam L emitted from the semiconductor laser device 41, when the wavelength of the laser beam L is set up at 785 nm, it is possible to make the cross-sectional beam diameter of the laser beam L large. Also, by setting up the wavelength at 630 nm or shorter, it is possible to make the cross-sectional beam diameter of the laser beam L smaller.

The reflection mirror after the deflection is configured of a plane surface, and correction of the surface inclination is performed only by the imaging lens 61.

As a matter of course, the surface shape of the imaging lens 61 may be, for example, a topic lens having a rotation symmetrical axis to the main scanning axis and having a varied curvature of the sub-scanning direction depending upon the scanning position. According to this, a refractive power of the sub-scanning direction varies depending upon the scanning position, and a scanning line curvature can be corrected. Furthermore, in the case where the curved surface of the sub-scanning direction has a rotation symmetrical axis, a degree of freedom of the curvature of the sub-scanning direction is widened, and it is possible to achieve the correction more precisely.

Figure 5A:
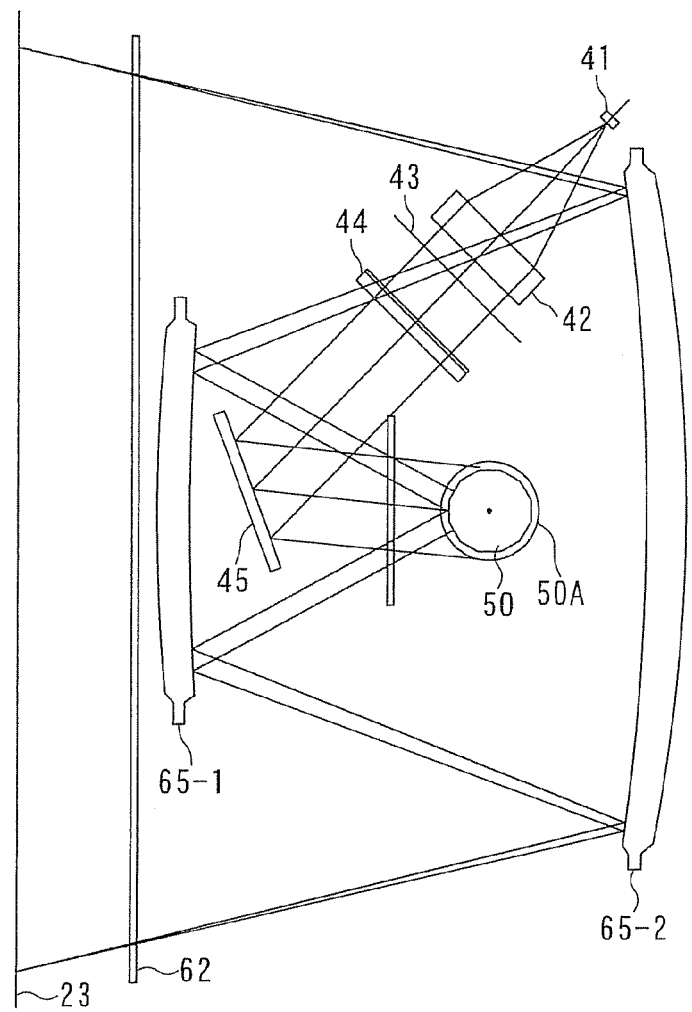
FIG. 5 is a diagram to show a detailed configuration of an optical beam scanning apparatus in the case of using an imaging mirror.
Figure 5B:
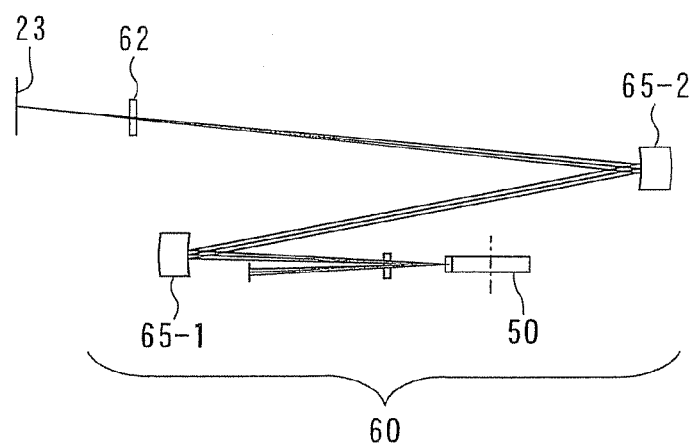

Also, for example, as illustrated in FIGS. 5(*a*) and 5(*b*), imaging mirrors 65-1 and 65-2 having a power may be used in place of the imaging lens 61.

Figure 6A:
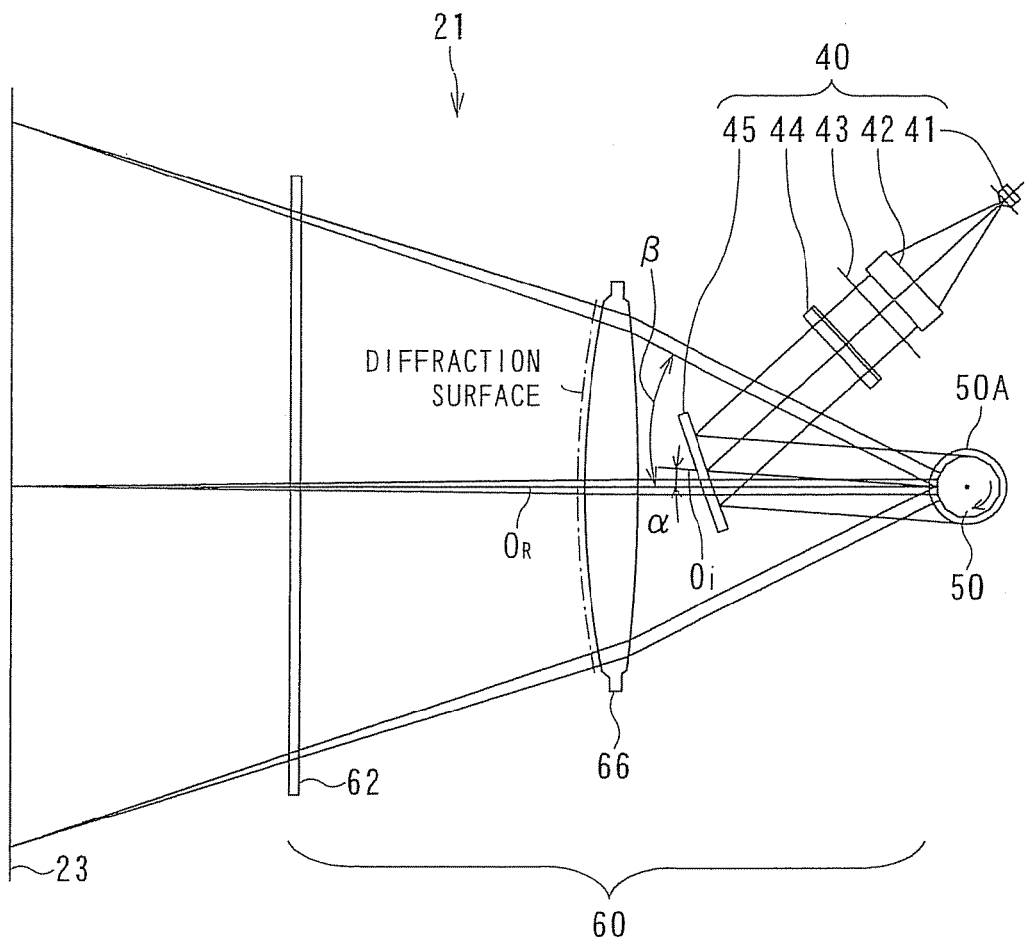
FIG. 6 is an explanatory view to explain an imaging lens including a surface having a diffraction surface.
Figure 6B:
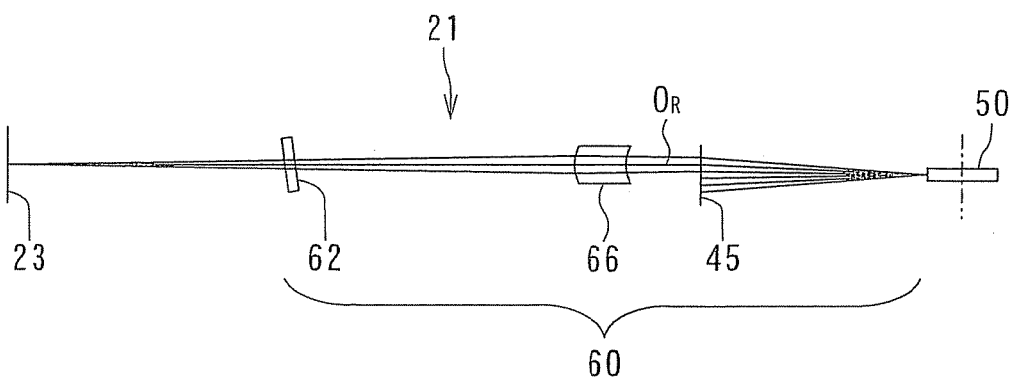

Here, for example, as in an imaging lens 66 as illustrated in FIGS. 6(*a*) and 6(*b*), the imaging lens 61 which is included in the post-deflection optical system 60 may include a surface having a diffraction surface (diffraction optical device). According to this, the influence due to an environmental fluctuation can be reduced. Incidentally, in the case of the imaging lens 66 as illustrated in FIGS. 6(*a*) and 6(*b*), the diffraction surface is provided only in a side of the emitting surface, but the diffraction surface may be provided in a side of the incident surface or on the both surfaces. As a matter of course, the same is also applicable in the case where plural imaging lenses are configured. Also, not only the imaging lens but other optical device may be provided.

Figure 7A:
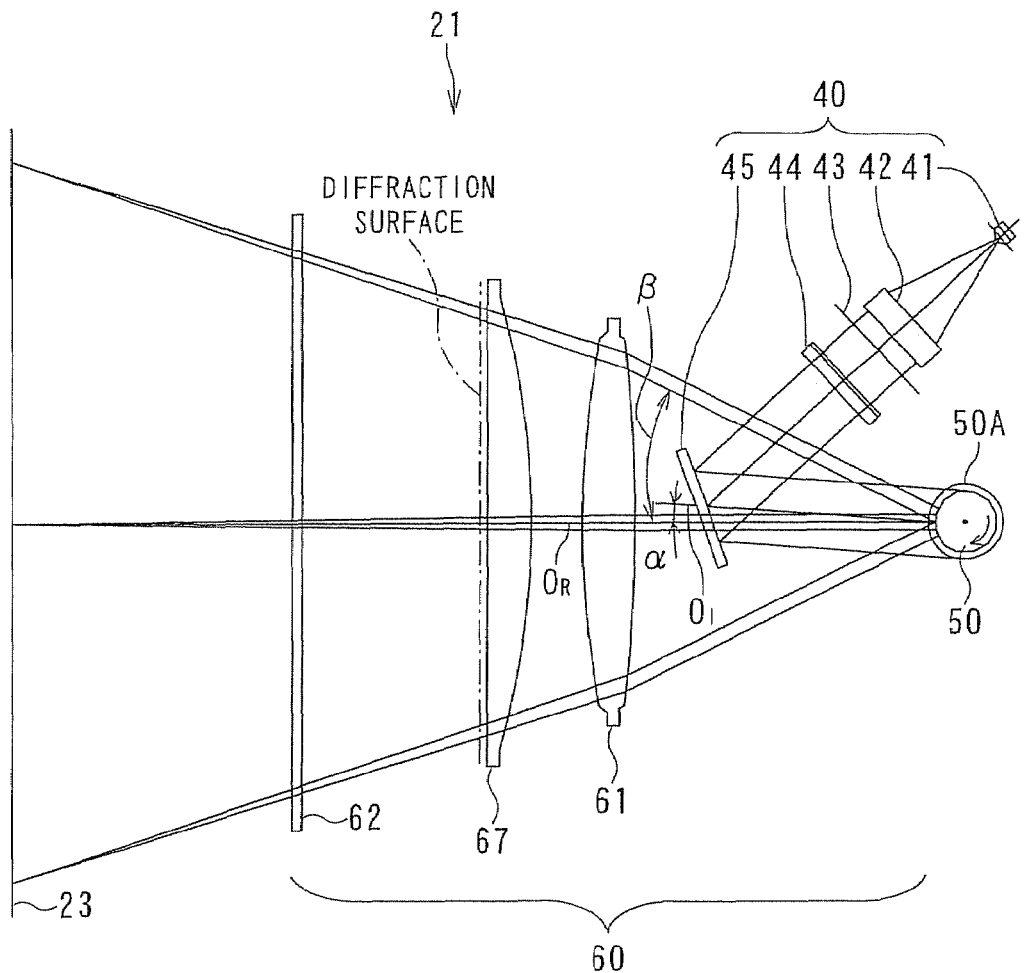
FIG. 7 is an explanatory view to explain other imaging lens including a surface having a diffraction surface.
Figure 7B:
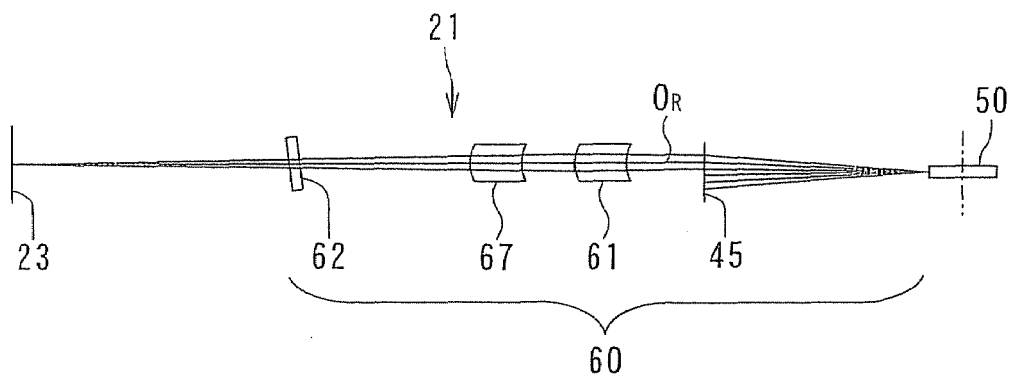

Also, in general, for example, as in an imaging lens 67 as illustrated in FIGS. 7(*a*) and 7(*b*), the diffraction surface is provided on a plane surface. But, for example, as in the imaging lens 66 as illustrated in FIGS. 6(*a*) and 6(*b*), by imparting it to a surface with a power, it is possible to reduce the number of lenses. Furthermore, by bringing a power by a diffraction optical device, it is possible to reduce a fluctuation in the wall thickness or to make the wall thickness thin; and it is possible to improve the productivity and the precision and to reduce the cost due to shortening of a molding time.

Figure 8:
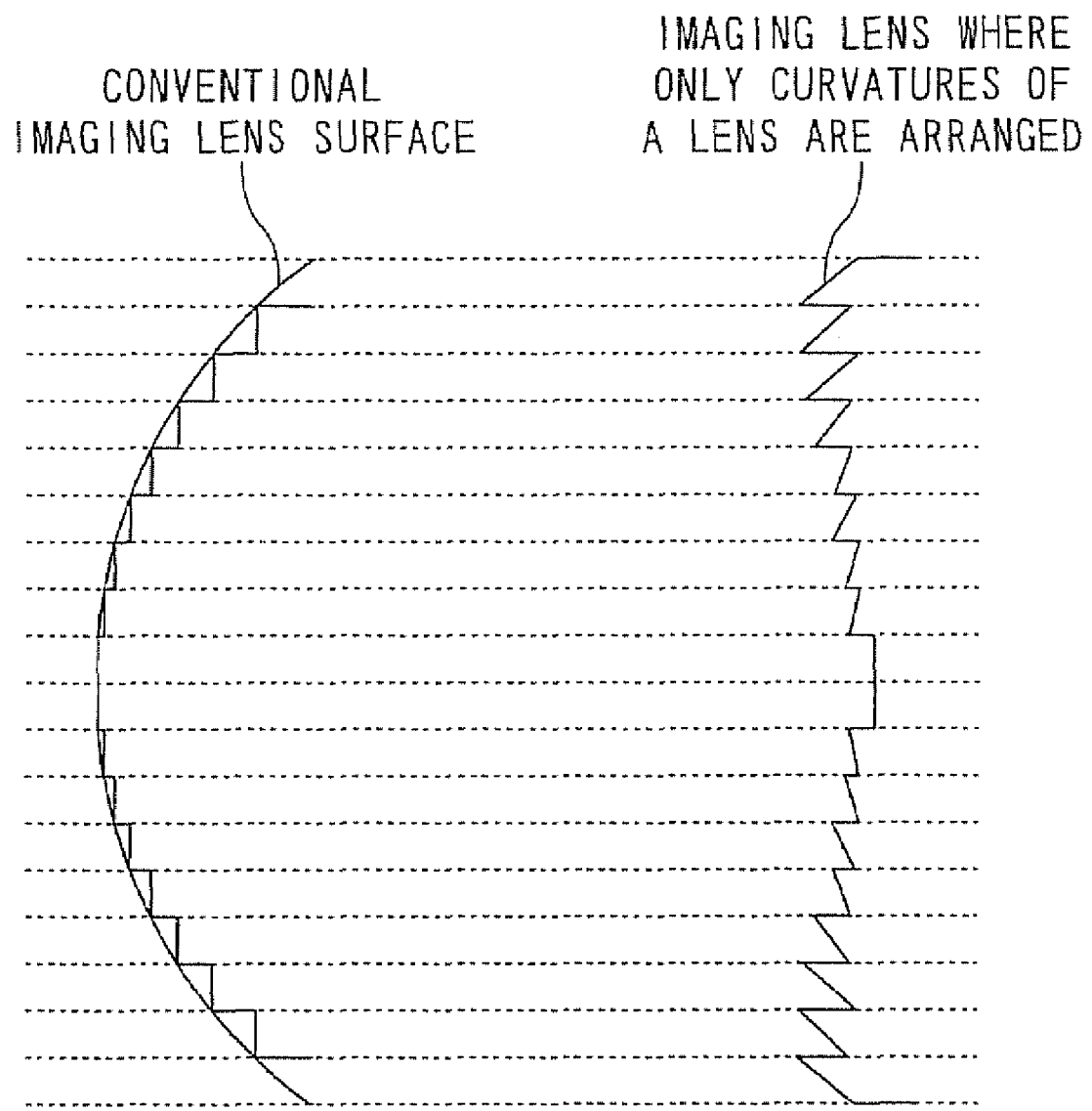
FIG. 8 is an explanatory view to explain an imaging lens where only curvatures of a lens are arranged.
Figure 9A:
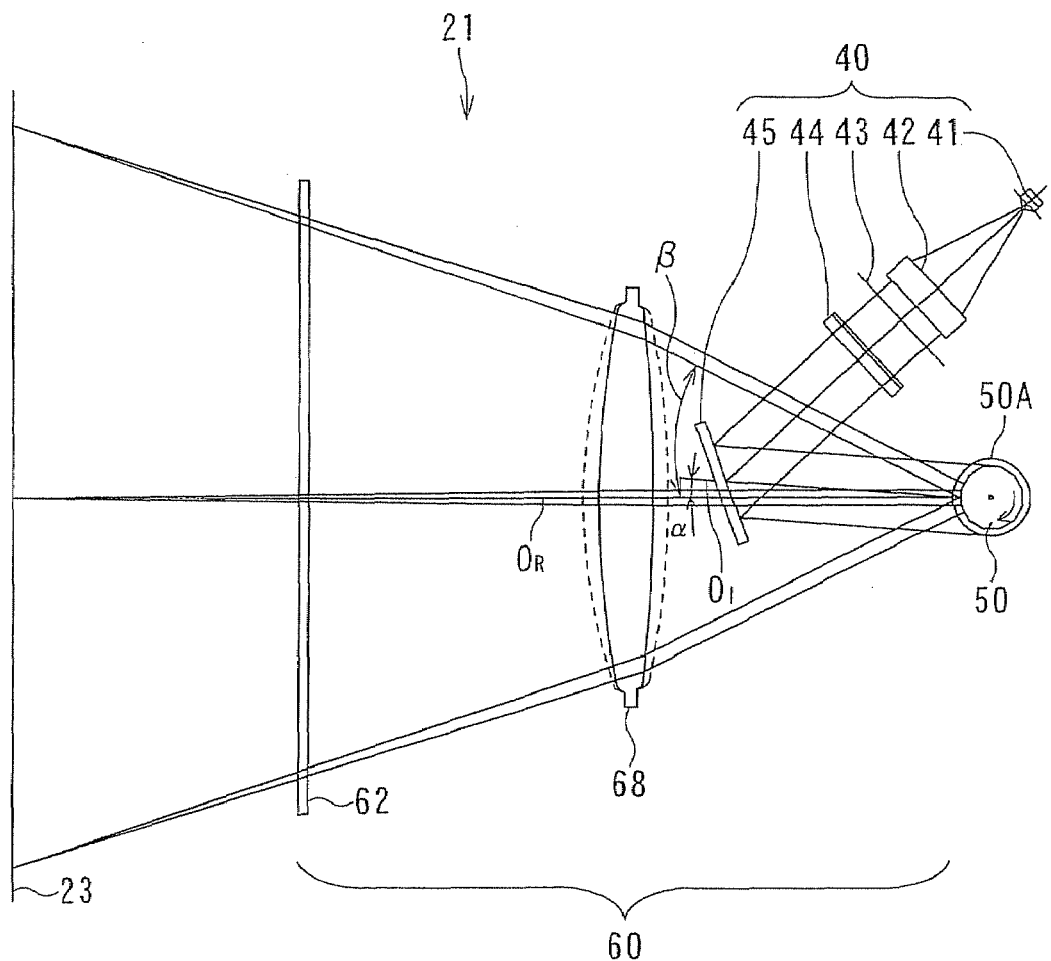
FIG. 9 is an explanatory view to explain other imaging lens including a surface having a diffraction surface.
Figure 9B:
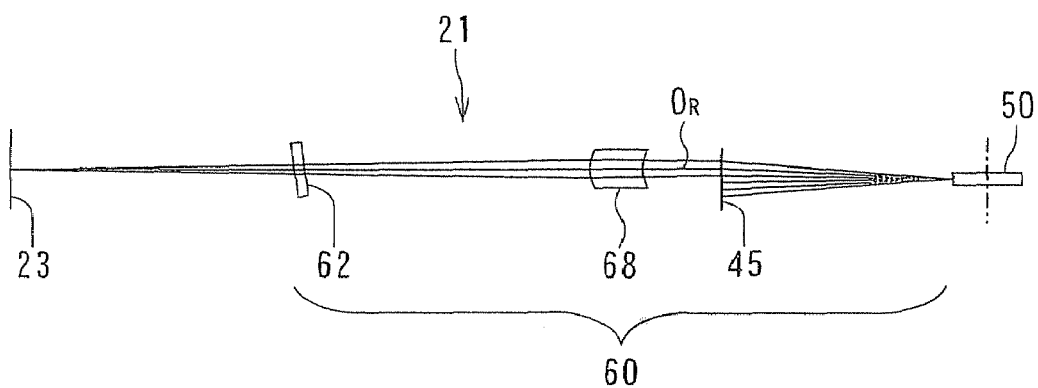

That is, for example, as illustrated in FIG. 8, by arranging only curvatures of lens having a power of the conventional imaging lens 61, it is possible to reduce a fluctuation in the wall thickness and to make the wall thickness thin while having a lens action. According to this, as in an imaging lens 68 as illustrated in FIG. 9, the fluctuation in the wall thickness of lens can be reduced. Also, in the case where plural optical devices after the deflection are configured, the number of optical devices can be reduced.

Incidentally, a non-illustrated horizontal synchronous sensor is provided in an opposite side to the polygon mirror 50.

Now, in general, in scanning a luminous flux made emitted from the semiconductor laser device 41 on the photoconductive drum 23, in the underillumination scanning optical system, an edge part of the polygon mirror 50 is not used, whereas in the overillumination scanning optical system, an edge part of the polygon mirror is used.

Figure 10:
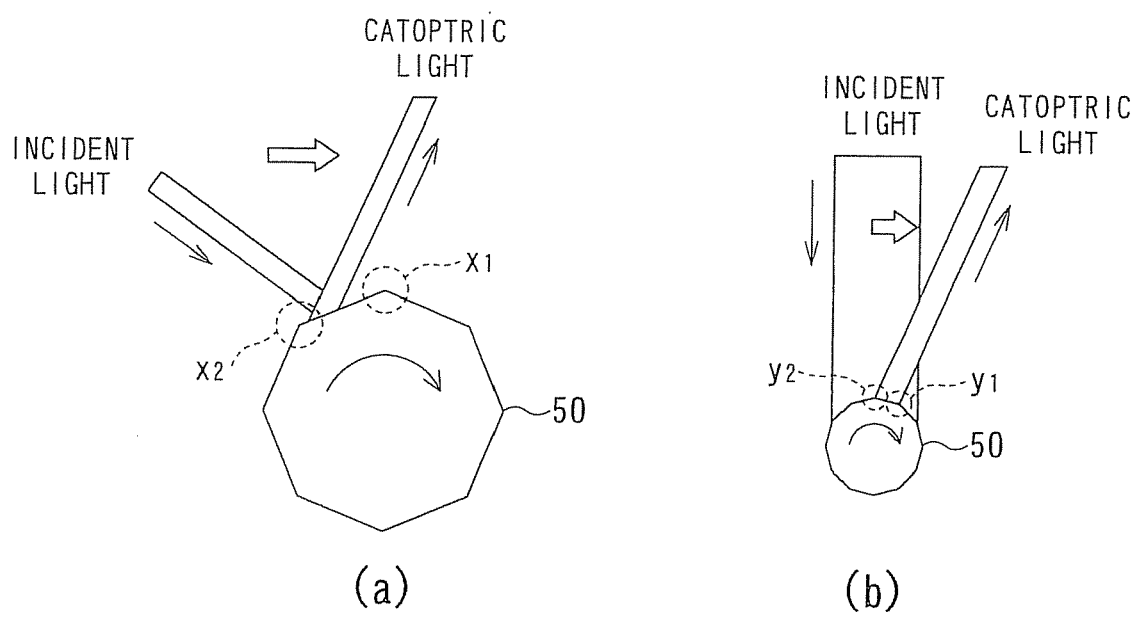
FIG. 10 is an outline view to show a reflection position on a polygon mirror surface of an underillumination scanning optical system or an overillumination scanning optical system.

Concretely, for example, as illustrated in FIG. 10(*a*), in scanning a luminous flux made emitted from the semiconductor laser device 41 on the photoconductive drum 23, in the underillumination scanning optical system, edge parts $x_1$ and $x_2$ of the main scanning direction of the polygon mirror 50 are not used. However, for example, as illustrated in FIG. 10(*b*), in scanning a luminous flux made emitted from the semiconductor laser device 41 on the photoconductive drum 23, in the over-illumination scanning optical system, edge parts $y_1$ and $y_2$ of the main scanning direction of the polygon mirror 50 are used.

Here, in the edge parts $y_1$ and $y_2$ of the main scanning direction of the polygon mirror 50, an error in that shape is large. For that reason, when a luminous flux is deflected (scanned) by using the edge parts $y_1$ and $y_2$, the luminous flux to be deflected (scanned) becomes dull, whereby a wave front aberration is deteriorated in the entire scanning region on the photoconductive drum 23. As a result, the beam diameter on the photoconductive drum 23 as an image surface increases, whereby a beam profile is deteriorated.

However, in the case where the imaging lens 61 to be provided in the post-deflection optical system 60 is an fθ lens configured of a single lens, it is similarly difficult to correct a wave front aberration in the entire scanning region on the photoconductive drum 23 because the number of surfaces which can be utilized for the correction of the wave front aberration is only two of an incident surface and an emitting surface.

In addition, in general, as illustrated in FIG. 2, a dustproof glass 62 as a flat plate glass for preventing turnaround of the toner, dusts or paper powder or the like floating within the image forming section 22 into a non-illustrated housing of the optical beam scanning apparatus 21 is provided in the post-deflection optical system 60; and on the other hand, even when it is intended to correct the wave front aberration in the entire scanning region on the photoconductive drum 23, it is difficult to correct the wave front aberration in the entire scanning region on the photoconductive drum 23 by the imaging lens 61 and the flat plate glass because the number of sheet which can be utilized for the correction of the wave front aberration is only one.

Figure 11A:
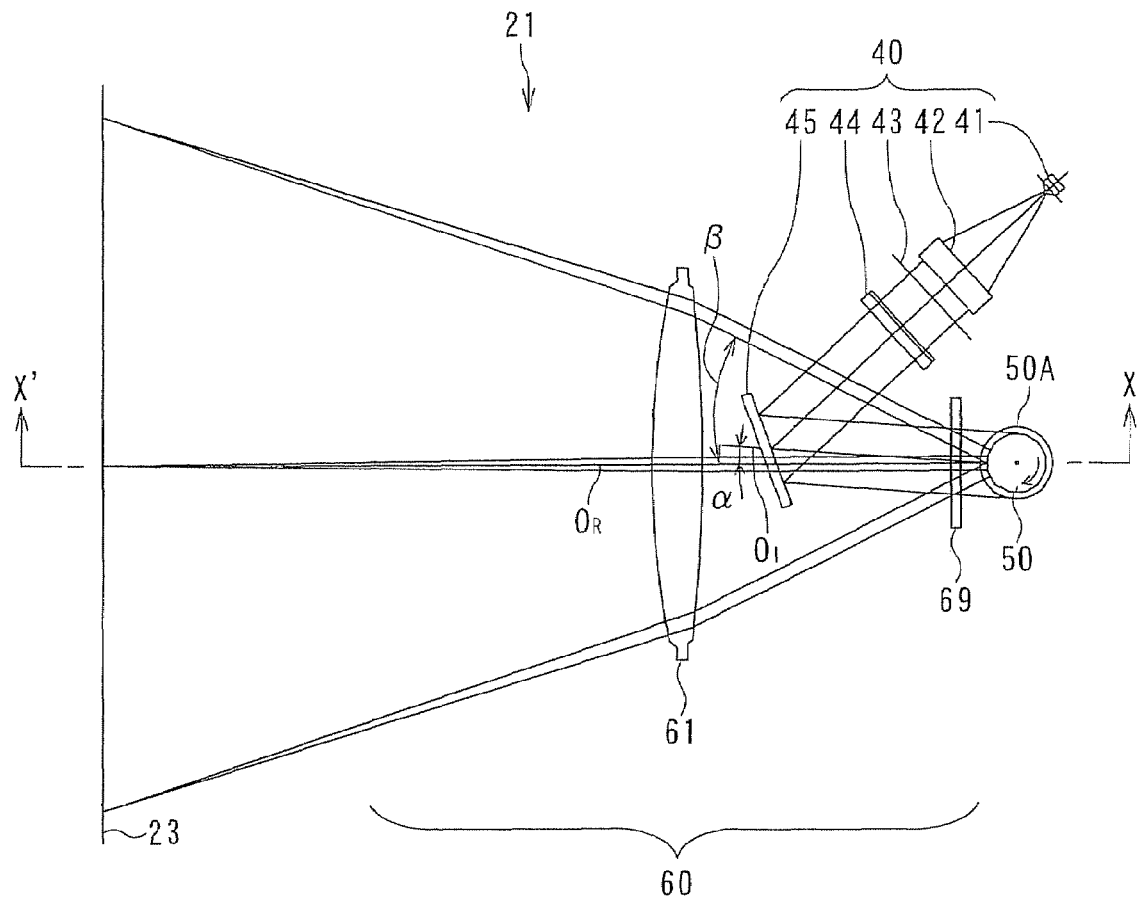
FIG. 11 is an explanatory view to explain a flat plate glass provided between a polygon mirror and an imaging lens particularly in a post-deflection optical system.
Figure 11B:
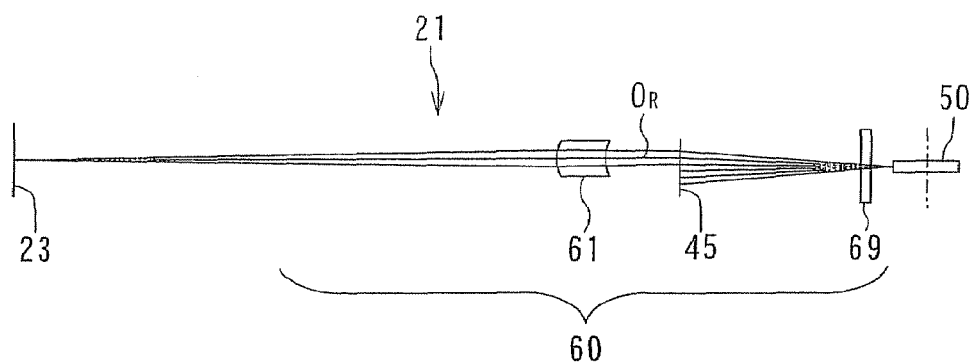

Here, for example, as illustrated in FIG. 11, in general, a flat plate glass 69 is provided as a countermeasure to the noise of the polygon mirror 50 between the polygon mirror 50 and the imaging lens 61 particularly in the post-deflection optical system 60.

Figure 12A:
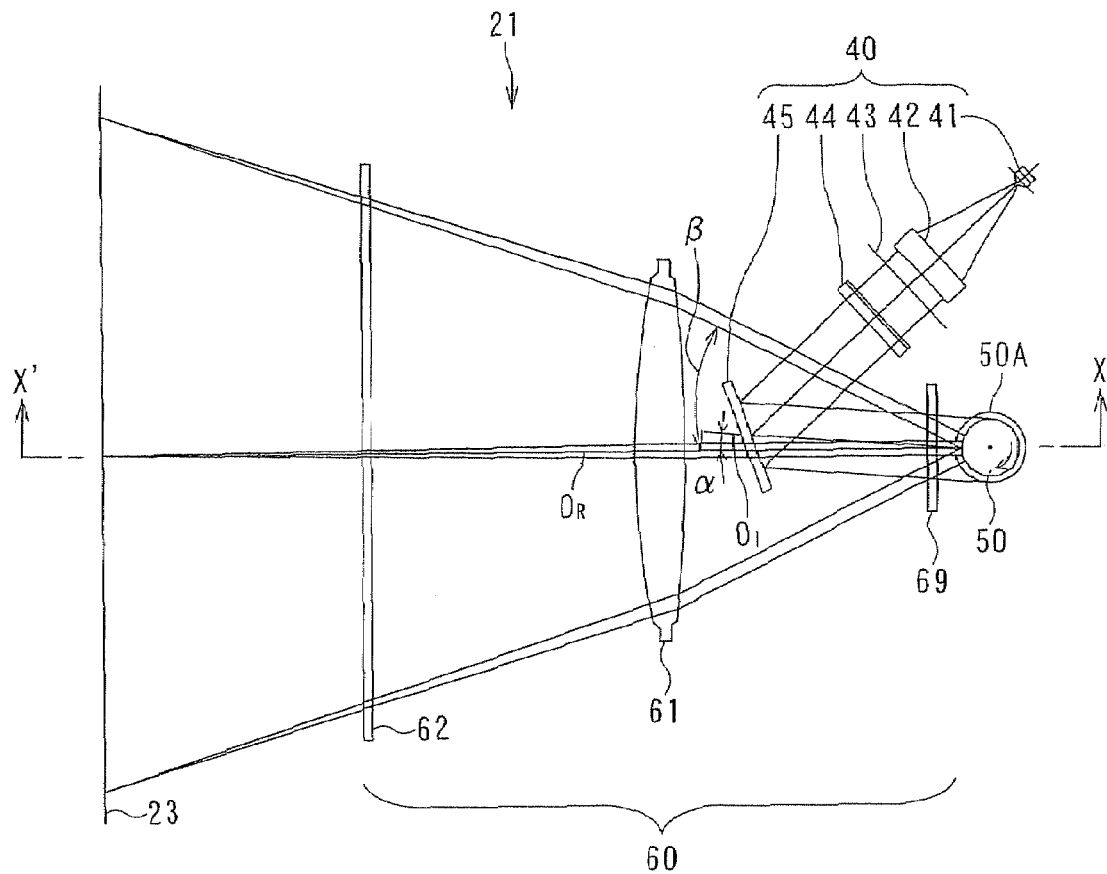
FIG. 12 is an explanatory view to explain a correction method for correcting a wave from aberration on a photoconductive drum according to the invention.
Figure 12B:
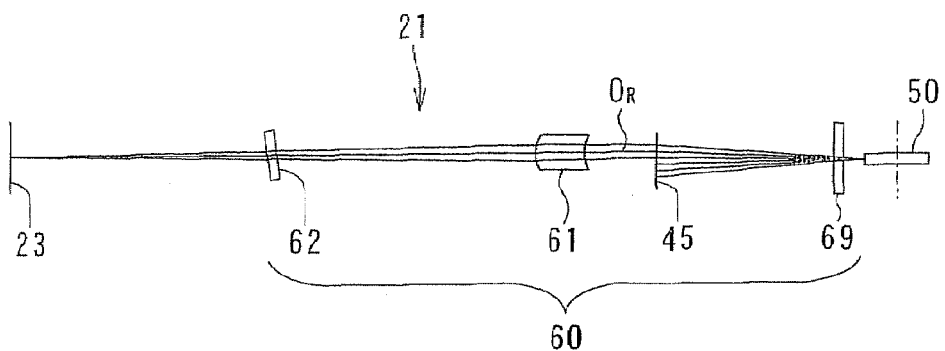

Then, for the purpose of suitably correcting the wave front aberration while making it easy to correct the wave front aberration in the entire scanning region on the photoconductive drum 23, for example, as illustrated in FIG. 12, the dustproof glass 62 as a flat plate glass is provided between the imaging lens 61 and the photoconductive drum 23 particularly in the post-deflection optical system 60; and at the same time, the flat plate glass 69 is provided as a countermeasure to the noise of the polygon mirror 50 between the polygon mirror 50 and the imaging lens 61 particularly in the post-deflection optical system 60.

According to this, it is possible to suitably correct the wave front aberration while making it easy to correct the wave front aberration in the entire scanning region on the photoconductive drum 23. Accordingly, it is possible to not only suitably correct the wave front aberration on the photoconductive drum 23 but obtain suitable beam diameter and beam profile on the photoconductive drum 23.

Figure 13A:
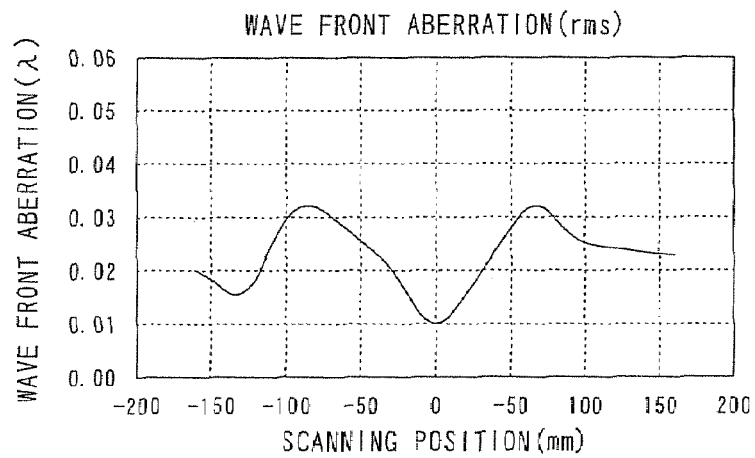
FIG. 13 is a diagram to show a simulation result in the case of correcting a wave front aberration on a photoconductive drum by employing a correction method for correcting a wave from aberration on a photo-conductive drum according to the invention.
Figure 13B:
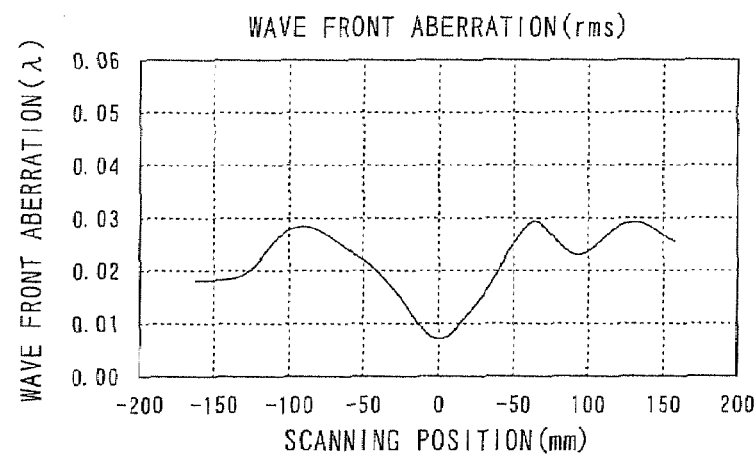

FIG. 13(*a*) shows a simulation result in the case of correcting the wave front aberration by using a single sheet of flat plate glass (the dustproof glass 62 or the flat plate glass 69) as illustrated in FIG. 2 or FIG. 11; and FIG. 13(*b*) shows a simulation result in the case of correcting the wave front aberration by using the two sheets of flat plate glass (the dustproof glass 62 and the flat plate glass 69) as illustrated in FIG. 12.

Incidentally, in all of FIGS. 13(*a*) and 13(*b*), it is shown that the higher the numerical value on the ordinate, the worse the wave front aberration is.

For example, as illustrated in FIGS. 13(*a*) and 13(*b*), in the case where the wave front aberration is corrected by using a single sheet of flat plate glass, the worst wave front aberration is $0.032\lambda$; whereas in the case where the wave front aberration is corrected by using two sheets of flat plate glass, the worst wave front aberration is $0.028\lambda$. This matter demonstrates that as compared with the case where the wave front aberration is corrected by using a single sheet of flat plate glass, in the case where the wave front aberration is corrected by using two sheets of flat plate glass, the worst wave front aberration becomes small.

Incidentally, since the flat plate glass 69 which is provided between the polygon mirror 50 and the imaging lens 61 particularly in the post-deflection optical system 60 as a countermeasure to the noise of the polygon mirror 50 deteriorates a transmittance of the luminous flux, a coating may be applied on the flat plate glass 69 for the purpose of suppressing the deterioration of transmittance. According to this, it is possible to more suitably correct the wave front aberration while making it easy to correct the wave front aberration in the entire scanning region on the photoconductive drum 23.

Figure 14:
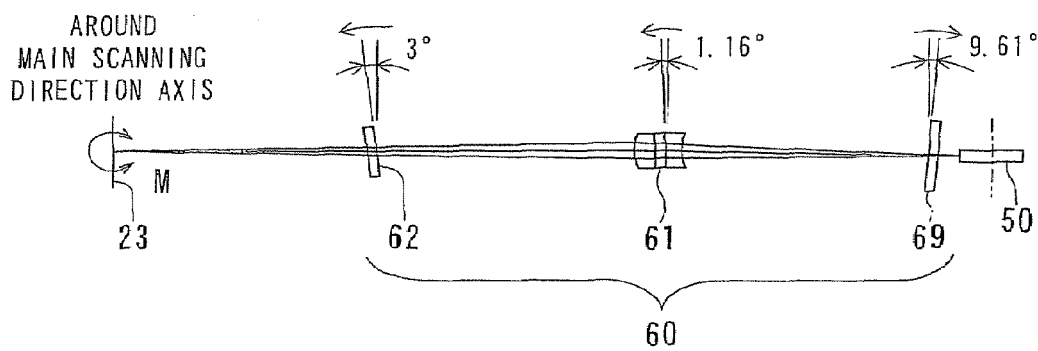
FIG. 14 is an explanatory diagram to explain an inclination method for inclining a flat plate glass around a main scanning direction axis against an optical axis in correcting a wave front aberration on a photoconductive drum according to the invention.

In addition, usually, though the dustproof glass 62 is provided at substantially 90° against the optical axis between the imaging lens 61 and the photoconductive drum 23 particularly in the post-deflection optical system 60, and similarly, the flat plate glass 69 is provided in a positional relation of substantially 90° against the optical axis between the polygon mirror 50 and the imaging lens 61 particularly in the post-deflection optical system 60, it is better that the optical axis dustproof glass 62 and the flat plate glass 69 are each further inclined around the main scanning direction axis (namely, around the longitudinal direction axis of the photoconductive drum 23 as shown by an arrow M in FIG. 14) against the respective optical axis at a required angle. Concretely, for example, as illustrated in FIG. 14, the dustproof glass 62 is further inclined at, for example, 3° around the main scanning direction axis against the optical axis between the imaging lens 61 and the photoconductive drum 23 particularly in the post-deflection optical system 60; and the flat plate glass 69 is further inclined at, for example, 9.61° around the main scanning direction axis against the optical axis between the polygon mirror 50 and the imaging lens 61 particularly in the post-deflection optical system 60. Incidentally, at this time, the directions to which the two sheets of glass (the dustproof glass 62 and the flat plate glass 69) are inclined are reverse to each other.

In addition, the imaging lens 61 is inclined at, for example, 1.16° around the main scanning direction axis against the optical axis of the post-deflection optical system 60. According to this, by inclining the respective optical parts, a degree of freedom in correcting the wave front aberration becomes large, and the wave front aberration can be uniformly reduced with a good balance. Incidentally, in the case of FIG. 5, the wave front aberration can also be similarly corrected by using the flat plate glass 69, the dustproof glass 62 and the like.

Incidentally, the inclination angle can be properly changed depending upon the wave front aberration on the photoconductive drum 23 to be corrected.

Incidentally, in the embodiment of the invention, while the wave front aberration in the entire scanning region on the photoconductive drum 23 has been corrected by providing the dustproof glass 62 as a flat plate glass between the imaging lens 61 and the photoconductive drum 23 particularly in the post-deflection optical system 60 and simultaneously providing the flat plate glass 69 as a countermeasure to the noise of the polygon mirror 50 between the polygon mirror 50 and the imaging lens 61 particularly in the post-deflection optical system 60, the invention is limited to such case. For example, more sheets of flat plate glass, namely three or more sheets of flat plate glass may be provided in the post-deflection optical system 60. According to this, it is possible to more suitably correct the wave front aberration while making it easier to correct the wave front aberration in the entire scanning region on the photoconductive drum 23. Accordingly, it is possible to not only more suitably correct the wave front aberration on the photoconductive drum 23 but obtain more suitable beam diameter and beam profile on the photoconductive drum 23.

Also, as a matter of course, the invention is also applicable to imaging lenses including a surface having a diffraction surface (diffraction optical device) (for example, imaging lens 66 to 68 explained with reference to FIGS. 6 to 9).

Furthermore, in the embodiment of the invention, while the flat plate glass (the dustproof glass 62 or the flat plate glass 69) has been used for the purpose of correcting a wave front aberration on the photoconductive drum 23, the invention is not limited to such case, but other flat plates using a resin may be used. That is, so far as it is possible to correct the wave front aberration on the photoconductive drum 23, flat plates made of any material may be used.

Incidentally, in the embodiment of the invention, while the invention has been applied to the overillumination scanning optical system, as a matter of course, the invention may be applied to the underillumination scanning system.

Furthermore, the number of a luminous flux from the light source may be one or plural.

What is claimed is:

1. An optical beam scanning apparatus comprising:
   a light source configured to emit one or plural luminous fluxes,
   a pre-deflection optical system configured to form a luminous flux emitted from the light source to image the luminous flux as a line image in a prescribed direction corresponding to a main scanning direction,
   a scanning unit configured to scan the imaged luminous flux by the pre-deflection optical system against a scanning subject, and
   a post-deflection optical system configured to image the luminous flux scanned by the scanning unit on the scanning subject,
   in which a width of the luminous flux made incident on the scanning unit from the pre-deflection optical system is wider than a width of one reflecting surface forming the scanning unit, wherein
   at least two sheets of flat plate configured to transmit the luminous flux scanned by the scanning unit are provided in the post-deflection optical system.

2. The optical beam scanning apparatus according to claim 1, wherein the flat plate provided in the post-deflection optical system is a glass.

3. The optical beam scanning apparatus according to claim 1, wherein at least one sheet of flat plate is provided between the scanning unit and the scanning subject in the post-deflection optical system.

4. The optical beam scanning apparatus according to claim 1, wherein the flat plate provided in the post-deflection optical system is inclined at a required angle around a main scanning direction axis against a prescribed optical axis in the post-deflection optical system.

5. The optical beam scanning apparatus according to claim 1, wherein an optical parts for imaging the luminous flux scanned by the scanning unit on the scanning subject is included in the post-deflection optical system.

6. The optical beam scanning apparatus according to claim 5, wherein at least one sheet of flat plate is provided between the optical parts and the scanning subject in the post-deflection optical system.

7. The optical beam scanning apparatus according to claim 5, wherein the optical parts included in the post-deflection optical system is inclined at a required angle around a horizontal direction axis against a prescribed optical axis in the post-deflection optical system in the optical parts included in the post-deflection optical system.

8. The optical beam scanning apparatus according to claim 5, wherein the optical parts included in the post-deflection optical system is configured of a single lens.

9. The optical beam scanning apparatus according to claim 5, wherein the optical parts included in the post-deflection optical system is a lens or a mirror.

10. The optical beam scanning apparatus according to claim 5, wherein at least one surface of the optical parts included in the post-deflection optical system is configured of a diffraction optical device.

11. An image forming apparatus provided with an optical beam scanning apparatus comprising:
   a light source configured to emit one or plural luminous fluxes,
   a pre-deflection optical system configured to form a luminous flux emitted from the light source to image the luminous flux as a line image in a prescribed direction corresponding to a main scanning direction,
   a scanning unit for scanning the imaged luminous flux by the pre-deflection optical system against a scanning subject, and
   a post-deflection optical system configured to image the luminous flux scanned by the scanning unit on the scanning subject,
   in which a width of the luminous flux made incident on the scanning unit from the pre-deflection optical system is wider than a width of one reflecting surface forming the scanning unit, wherein
   at least two sheets of flat plate configured to transmit the luminous flux scanned by the scanning unit are provided in the post-deflection optical system.

12. The image forming apparatus according to claim 11, wherein the flat plate provided in the post-deflection optical system is a glass.

13. The image forming apparatus according to claim 11, wherein at least one sheet of flat plate is provided between the scanning unit and the scanning subject in the post-deflection optical system.

14. The image forming apparatus according to claim 11, wherein the flat plate provided in the post-deflection optical system is inclined at a required angle around a main scanning direction axis against a prescribed optical axis in the post-deflection optical system.

15. The image forming apparatus according to claim 11, wherein an optical parts for imaging the luminous flux scanned by the scanning unit on the scanning subject is included in the post-deflection optical system.

16. The image forming apparatus according to claim 15, wherein at least one sheet of flat plate is provided between the optical parts and the scanning subject in the post-deflection optical system.

17. The image forming apparatus according to claim 15, wherein the optical parts included in the post-deflection optical system is inclined at a required angle around a horizontal direction axis against a prescribed optical axis in the post-deflection optical system in the optical parts included in the post-deflection optical system.

18. The image forming apparatus according to claim 15, wherein the optical parts included in the post-deflection optical system is configured of a single lens.

19. The image forming apparatus according to claim 15, wherein the optical parts included in the post-deflection optical system is a lens or a mirror.

20. The image forming apparatus according to claim 15, wherein at least one surface of the optical parts included in the post-deflection optical system is configured of a diffraction optical device.

* * * * *